US010988357B2

(12) United States Patent
Han et al.

(10) Patent No.: US 10,988,357 B2
(45) Date of Patent: Apr. 27, 2021

(54) DISC LOCKING DEVICE

(71) Applicant: Shijiazhuang Nuron Brake Technology Co. Ltd., Hebei (CN)

(72) Inventors: Wulin Han, Hebei (CN); Xiongyi Hao, Hebei (CN)

(73) Assignee: Shijiazhuang Nuron Brake Technology Co. Ltd., Hebei (CN)

( * ) Notice: Subject to any disclaimer, the term of this patent is extended or adjusted under 35 U.S.C. 154(b) by 106 days.

(21) Appl. No.: 16/317,900

(22) PCT Filed: Apr. 19, 2017

(86) PCT No.: PCT/CN2017/081001
§ 371 (c)(1),
(2) Date: Jan. 15, 2019

(87) PCT Pub. No.: WO2018/137292
PCT Pub. Date: Aug. 2, 2018

(65) Prior Publication Data
US 2020/0156909 A1  May 21, 2020

(30) Foreign Application Priority Data
Jan. 25, 2017  (CN) .......................... 201710056020.4

(51) Int. Cl.
*B66D 5/14* (2006.01)
*B66D 5/30* (2006.01)
(Continued)

(52) U.S. Cl.
CPC ................. *B66D 5/14* (2013.01); *B66D 5/30* (2013.01); *B66B 5/18* (2013.01); *F16D 59/02* (2013.01);
(Continued)

(58) Field of Classification Search
CPC ..... B66B 5/18; F16D 59/02; F16D 2069/004; F16D 2121/22
See application file for complete search history.

(56) References Cited

U.S. PATENT DOCUMENTS 2,716,467 A * 8/1955 Callaway .................. B66B 5/22
187/376
3,762,512 A * 10/1973 McIntyre .................. B66B 5/22
188/189
(Continued)

FOREIGN PATENT DOCUMENTS

| CN | 104444689 | 3/2015 |
| CN | 105480890 | 4/2016 |

(Continued)

OTHER PUBLICATIONS

Written Opinion and International Search Report of PCT/CN2017/081001, dated Oct. 12, 2017, 11 pages (English and Chinese).

*Primary Examiner* — Vishal R Sahni
(74) *Attorney, Agent, or Firm* — Rankin, Hill & Clark LLP

(57) ABSTRACT

A disc locking device, comprising: a base, a brake clamping block, a support mechanism, a front baffle, a limiting cover plate, a needle roller slide plate and a brake triggering mechanism, and so on. The base includes a bottom plate and two side vertical plates which are integrally arranged on the bottom plate; the two side vertical plates are oppositely arranged, and the inner walls thereof are all lateral slope surfaces, so that a wedge-shaped groove having a large front opening and a small rear opening is formed between the two laterally-vertical plates; and mounting holes penetratingly connected to the brake triggering mechanism are formed on the side vertical plates. The support mechanism includes a front support mechanism and a rear support mechanism.

15 Claims, 1 Drawing Sheet

(51) Int. Cl.
  *B66B 5/18* (2006.01)
  *F16D 59/02* (2006.01)
  *F16D 65/092* (2006.01)
  *F16D 69/00* (2006.01)
  *F16D 121/22* (2012.01)

(52) U.S. Cl.
  CPC ...... *F16D 65/092* (2013.01); *F16D 2069/004* (2013.01); *F16D 2121/22* (2013.01)

(56) References Cited

U.S. PATENT DOCUMENTS

| | | | | |
|---|---|---|---|---|
| 6,786,308 B1 * | 9/2004 | Huang | ................. | B60T 8/3225 |
| | | | | 188/24.12 |
| 2016/0137456 A1 * | 5/2016 | Duvall | ..................... | B66B 5/22 |
| | | | | 187/359 |

FOREIGN PATENT DOCUMENTS

| GB | 191022748 | * 12/1910 |
|---|---|---|
| KR | 20170130987 | * 11/2017 |

* cited by examiner

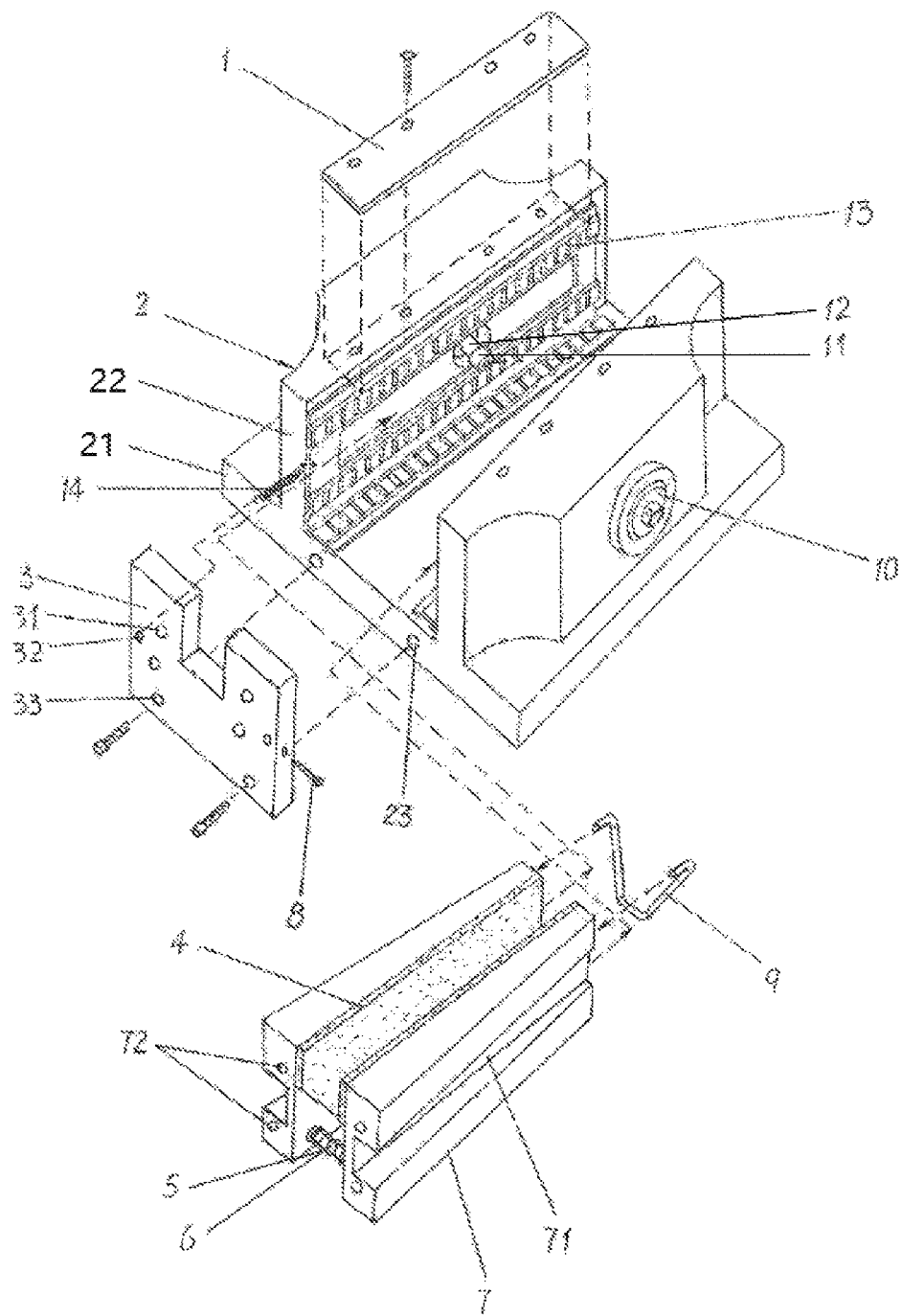

DISC LOCKING DEVICE

CROSS REFERENCE

This application claims priority of Chinese Patent Application No. 201720096520.6 filed on Jan. 25, 2017, entitled "a disc locking device", and Application No. 201710056020.4 filed on Jan. 25, 2017, entitled "a disc locking device", which are hereby incorporated herein reference as if fully set forth herein.

TECHNICAL FIELD

The present application relates to a safety brake, and more particularly to a disc locking device for safely braking a wheel disc.

BACKGROUND

The applicant has previously applied a disc locking device patent (publication number CN105480890A), the disc locking device includes two frames oppositely disposed, and between the two frames is formed a gap for clamping the wheel disc, each of the frame is provided with a brake clamping block, clamping surfaces of the brake clamping blocks in the two frames are oppositely disposed, the clamping surface of the brake clamping block is provided with a friction plate; the two brake clamping blocks constitutes a combined wedge-shaped body, and the two frames constitutes a combined wedge-shaped groove for clamping the combined wedge-shaped body; a tension spring is arranged on the frame, the tension spring is connected to the brake clamping block in the frame so as to pull the brake clamping block so that its back is attached to the inner edge of the frame. The disc locking device is small in size and is easy to install on the brake wheel disc of various existing hoisting device, and depending on the wedge-shaped structure can perform emergency braking on the large torque wheel disc.

However, such a disc locking device has certain deficiencies in use, such as occasional deformation of the device during braking with a large torque, which may result in the brake disc cannot being locked, and if the brake disc is eccentrically rotated, so that the reliability of the disc locking device can be reduced due to the fact that false braking can occur.

SUMMARY

An objective of the present application is to provide a disc locking device with high reliability to solve the problem of low reliability of the existing disc locking device.

The objective of the present application is achieved as follows: a disc locking device, comprising: a base, a brake clamping block, a support mechanism, a front baffle and a brake trigger mechanism;

the base includes a bottom plate and two side vertical plates integrally formed on the bottom plate, the two side vertical plates are oppositely disposed, and inner walls thereof are lateral slope surfaces, so that a wedge-shaped groove having a large front opening and a small rear opening is formed between two side vertical plates, and each of the side vertical plates is provided with a mounting hole for connecting the brake trigger mechanism therethrough;

the number of the brake clamping blocks are two and the two brake clamping blocks are juxtaposed, and disposed in the wedge-shaped groove formed between the two side vertical plates on the base; a friction plate is disposed on a clamping surface of each brake clamping block, a back of each brake clamping block is lateral slope surface, so that a body of the brake clamping block forms a wedge-shaped body, and the back of the brake clamping block is provided with a lateral chute for inserting a brake push rod;

the support mechanism includes a front support mechanism for laterally elastically pushing front portions of the two brake clamping blocks and a rear support mechanism for laterally elastically pushing the rear portions of the two brake clamping blocks;

the front baffle is fixed at the front opening of the wedge-shaped groove of the base for blocking the escape of the brake clamping block in the wedge-shaped groove from the front opening;

the brake trigger mechanism is connected to the brake push rod by a compression spring, and the brake trigger mechanism is mounted in the mounting hole of each side vertical plate, and the brake push rod passes through the mounting hole, with the front end of the brake push rod passing through a hole in the inner wall of the side vertical plate and abutting within the lateral chute of the brake clamping block.

The present application further includes a limiting cover plate laterally disposed at an upper edge of the side vertical plate for preventing the brake clamping block from escaping from a top of the wedge-shaped groove; the inner side of the limiting cover plate exceeds the clamping surface of the brake clamping block at the side of the limiting cover plate on the initial position to limit the eccentric rotation of the brake disc to prevent erroneous braking caused by the eccentric of the brake disc.

The present application further includes a needle roller slide plate, the needle roller slide plate is an L-shaped folded plate with a plurality of needle rollers being arranged in a row on the surface thereof; the needle roller slide plate abuts against sidewalls and bottom of the wedge-shaped groove of the base for providing a sliding support for the brake clamping block to reduce sliding friction between each brake clamping block and the base wedge-shaped groove of the base.

In the present application, a front end of the needle roller slide plate is attached with a tension spring, and the other end of the tension spring is fixed to the front baffle by a jackscrew.

The front support mechanism includes a support rod and a spring sleeved on the support rod, and each of two ends of the support rod is inserted within a first insertion hole at a position close to a front end of the clamping surface of each brake clamping block, the diameter of the support rod is smaller than the diameter of the first insertion hole, and both ends of the spring abut against the clamping surfaces of the brake clamping blocks.

The first insertion hole is disposed at the clamping surface of the brake clamping block at a position at a position close to a lower portion of the front end, so that the front support mechanism provides a brake disc channel between the two brake clamping blocks to ensure the hoisting device normal operation; a center line of the first insertion hole is perpendicular to the clamping surface of the brake clamping block, and a depth of the first insertion hole is controlled such that there is axial motion margin for the support rods when the two brake clamping blocks are in the clamped braking position, which avoids the situation that the support rods are held against the brake clamping blocks so that they cannot clamp the brake disc.

The rear support mechanism is a U-shaped spring, and the two upper ends of the U-shaped spring are bent into forwardly folded plugs, and the plugs are respective inserted into sockets defined in the rear end surface of the brake clamping blocks.

In the present application, a threaded hole is disposed on the front end surface of the brake clamping block, and the front surface of the front baffle is provided with a release hole opposite to the threaded hole.

A bearing or a roller is disposed on the front end of the brake push rod to reduce frictional resistance between the brake clamping block and the front end of the brake push rod during safety braking.

The present application adopts a high-strength rigid base as a base member and a forming component of the wedge-shaped groove, and with the synergistic action of the brake trigger mechanism, the support mechanism, the front baffle, the limiting cover plate and the needle roller slide plate, the flexible movement and reliable braking of the brake clamping block, and the eccentric blocking of the brake disc are realized, thereby eliminating the deformation of the device and avoiding the erroneous braking caused by the eccentric rotation of the brake disc, thereby greatly improving the reliability of the device, meeting standard requirements, truly achieving productization and making it possible to apply and popularize the safety brake.

The present application utilizes a brake trigger mechanism to apply a positive urging force to each brake clamping block, so that the friction plate on each brake clamping block abuts against the disk surface of the wheel disc, and is driven by the frictional force formed between the disk surfaces of the wheel disc. the two brake clamping blocks having the composite wedge-shaped structure are inserted into the small opening end of the wedge-shaped groove of the base, thereby quickly clamping the wheel disc to achieve the purpose of emergency braking the wheel disc.

The disc locking device of the present application is simple in structure and small in occupied position, and is convenient to install on the wheel disc side of the hoisting device, stable and reliable braking can be carried out on the large-torque wheel disc, and the problem that the existing hoisting equipment is not provided with the safety brake installation position is solved, and it can be effectively solved the problem that the hoisting equipment cannot have the safety brake installed at the wheel disc side as limited by the site.

BRIEF DESCRIPTION OF THE DRAWINGS

FIG. 1 is a schematic structure view of the present application.

In the FIG:

1, limiting cover plate, 2, base, 21, bottom plate, 22, side vertical plate, 23, fixing threaded hole, 3, front baffle, 31, hole, 32, tension spring positioning hole, 33, fixing hole, 4, friction plate, 5, spring, 6, support rod, 7, brake clamping block, 71, lateral chute, 72, threaded hole, 8, jackscrew, 9, U-shaped spring, 10, brake trigger mechanism, 11, bearing, 12, brake push rod, 13, needle roller slide plate, and 14, tension spring.

DETAILED DESCRIPTION OF THE EMBODIMENTS

As shown in FIG. 1, the disc locking device of the present application includes a base 2, a brake clamping block 7, a support mechanism, a needle roller slide plate 13, a front baffle 3, a limiting cover plate 1 and a brake trigger mechanism 10 and so on.

The base 2 includes a bottom plate 21 and two oppositely disposed thick-walled side vertical plates 22; the bottom plate 21 and the two side vertical plates 22 are integrally formed from high-strength mild steel to maintain maximum rigidity. The inner walls of the two side vertical plates 22 are both lateral slope surfaces, so that a wedge-shaped groove having a large front opening and a small rear opening is formed between the two side vertical plates 22. Each side vertical plate 22 is provided with a mounting hole for connecting the brake trigger mechanism therethrough. The mounting hole is a stepped circular hole in which the brake trigger mechanism 10 is mounted.

The number of the brake clamping blocks 7 are two and the two brake clamping blocks are juxtaposed, and the back of the brake clamping block 7 is a lateral slope surface, so that the body of each brake clamping block body forms a wedge-shaped body. Two brake clamping blocks 7 are arranged in parallel on the base 2 in a wedge-shaped groove formed between the two side vertical plates 22, but between the two brake clamping blocks is a parallel brake disk channel. A friction plate is disposed on the clamping surface of each brake clamping block 7, and the back of the brake clamping block 7 is provided with a lateral chute 71.

The brake trigger mechanism 10 is connected to the brake push rod 12 by a compression spring. The brake trigger mechanism 10 can be an electromagnet, a hydraulic device or a pneumatic device and so on, and can be a power failure trigger or a power-triggered operation mode. The brake trigger mechanism 10 is inserted into the mounting hole from the outside of the side vertical plate 22, and the brake push rod 12 passes through the mounting hole, and the front end thereof passes through the opening in the inner wall of the side vertical plate 22 and abuts against the lateral chute 71 of the brake clamping block 7. A bearing 11 or a roller or the like is provided on the front end of the brake push rod 12 to reduce the frictional resistance between the brake clamping block 7 and the brake push rod during the safe braking.

The support mechanism includes a front support mechanism for laterally elastically pushing front portions of the two brake clamping blocks and a rear support mechanism for laterally elastically pushing the rear portions of the two brake clamping blocks.

The front support mechanism comprises a support rod 6 and a spring 5 sleeved on the support rod 6, and two ends of the support rod 6 are inserted to a first insertion hole at a position close to a front end of the clamping surface of the brake clamping block 7, the diameter of the support rod 6 is smaller than the diameter of the first insertion hole, so that the support rod 6 has axial motion margin. Both ends of the spring 5 abut against the clamping faces of each brake clamping block blocks 7, so that the front end of the brake clamping block 7 abuts against the side vertical plates 22. A center line of the first insertion hole on the brake clamping block 7 is perpendicular to the clamping surface of the brake clamping block, and the depth of the first insertion hole is controlled when the two brake clamping blocks are in the clamped braking position the support rods still have axial motion margin. The first insertion hole is disposed at the clamping surface of each brake clamping block 7 at a position close to a lower portion of the front end, so that providing a working channel for the brake disc in the disc locking device.

The rear support mechanism is a U-shaped spring, and the two upper ends of the U-shaped spring are bent into forwardly folded plugs, and sockets are defined on the rear end surface of the brake clamping block 7, and one plug is inserted into one socket of the brake clamping block 7, the rear end of the brake clamping block 7 abuts against each side vertical plate 22 by the elastic restoring action of the U-shaped spring 9.

The support mechanism realizes the elastic wall-supporting to the brake clamping block, so that the state of the brake clamping block is stabilized and the brake disc channel between the two brake clamping blocks is smooth, which is beneficial to avoid erroneous braking. In addition, the front support mechanism of the support mechanism has the function of synchronously moving the two brake clamping blocks 7 to avoid the situation that the safety brake cannot be performed due to the unsynchronization of the brake clamping blocks.

The front baffle 3 is fixed at the front opening of the wedge-shaped groove of the base 2 for blocking the brake clamping block 7 in the wedge-shaped groove to prevent the brake clamping block from escaping from the front opening of the brake clamping block. The front baffle 3 may be a one-piece plate with an opening in the middle shown in FIG. 1, or two symmetrical bodies that are disconnected in the middle. The width of the intermediate opening or gap of the front baffle 3 is greater than the thickness of the brake disc to provide a rotational working space for the brake disc. A fixing hole 33 is disposed in a lower portion of the front baffle 3, and a fixing threaded hole 23 is formed on the front end surface of the base 2, so that the front baffle 3 can be fixed at the front port of the wedge-shaped groove of the base by using a fixed bolt.

The limiting cover plate 1 may be a cornice disposed on the inner side of the side vertical plate 22 and integrally formed with the base 2, or may be a separate cover plate. The limiting cover plate 1 shown in FIG. 1 is composed of two elongated soft metal plates (such as copper plates, etc.), and each limiting cover plate 1 is fixed on the top surface of a side vertical plate 22. The limiting cover plate 1 may also be a metal plate to which a copper strip is attached at its inner side. Each of the limiting cover plates 1 is fixed to the upper edge of a side vertical plate 22 by a fastener, and the limiting cover plate 1 protrudes inwardly, and the inner side thereof is covered above the wedge-shaped groove of the base for blocking the brake clamping block to prevent the brake clamping block from escaping from a top of the wedge-shaped groove.

In addition, the inner extension of the limiting cover plate 1 is exceeded the clamping surface of the brake block on the side of the limiting cover plate in the initial position (but cannot exceed the position of the brake block in the working position) to limit the eccentric rotation of the brake disc according to inner side thereof to prevent erroneous braking caused by the eccentric rotation of the brake disc.

A needle roller slide plate 13 is also disposed at the wedge-shaped groove of the base. The needle roller slide plate 13 is an L-shaped folded plate, and three rows of needle rollers are arranged on the surface thereof, two rows at side wall and one row at bottom face, and two rows of needle rollers on the side wall are used to support the rear wall of the brake clamping block. a row of needle rollers on the bottom surface is used to support the bottom surface of the brake clamping block. The needle roller slide plate 13 abuts against the side wall and bottom of the wedge-shaped groove of the base for providing sufficient effective sliding support for the brake clamping block 2 to reduce the frictional resistance between the brake clamping block 7 and the inner wall of the wedge-shaped groove. A lateral strip hole is formed at plate surface between the upper and lower rows of the needle rollers on the side wall of the needle roller slide plate 13 to allow the brake push rod 12 to pass through the needle rollers slide plate 13. A tension spring 14 is attached to the front end of the needle roller slide plate 13, and the front end of the tension spring 14 is fixed to the front bezel 3 by a jackscrew 8. The specific fixing manner is that: a through tension spring position hole 32 is disposed at the surface of the front baffle 3, and a threaded hole for threading the jackscrew is disposed on the side edge of the front baffle 3, and the threaded hole and the tension spring position hole are communicated, and the jackscrew is screwed from the threaded hole and is tightened in the threaded hole, the front end of the tension spring 14 can be positioned. The purpose of the tension spring is to elastically pull the needle roller slide plate 13 to prevent the needle roller slide plate 13 from escaping from the rear opening of the wedge-shaped groove as the brake clamping block moves, and can automatically return when the brake is operated.

Normally, the brake trigger mechanism 10 presses against the compression spring, and the brake push rod 12 does not actuate the brake clamping block 7, and the wheel rim of the brake disc can normally pass through the working channel between the two brake clamping blocks. When an emergency occurs (the brake of the winch is failure, etc.), the system sends a signal to disconnect the working power of the disc locking device, the brake trigger mechanism 10 releases the compression spring, and the brake push rod 12 is rapidly pushed forward by the compression spring to push the brake clamping block 7 against the brake disc, and the high-speed rotating brake disc drives the brake clamping block 7 to move toward the small opening of the wedge-shaped groove by the frictional force between the brake disc and the brake clamping block, thereby the brake disc is rapidly stopped by the two brake clamping block 7 with lateral relative motion in the lower wedge-shaped motion state 7, thereby achieving the purpose of emergency braking.

Two threaded holes 72 are also disposed in the front end surface of the brake clamping block 7, and a hole 31 is disposed on the front surface of the front baffle plate 3 opposite to the position of the threaded hole 72. When the brake clamping block 2 clamps the brake disc, it can be manually inserted into the threaded hole of the brake clamping block 7 by means of a bolt, the brake clamp 2 can be forcibly pulled back in the process of continuously screwing the bolt, so that the clamped brake clamping block is opened to realize the release operation. This way is very simple and easy for the maintenance personnel to learn and operate.

What is claimed is:

1. A disc locking device, comprising: a base, brake clamping blocks, a support mechanism, a front baffle and a brake trigger mechanism; wherein the base comprises a bottom plate and two side vertical plates integrally formed on the bottom plate, the two side vertical plates are oppositely disposed, and inner walls of the two side vertical plates are lateral slope surfaces such that a wedge-shaped groove having a large front opening and a small rear opening is formed between the two side vertical plates, and each of the two side vertical plates is provided with a mounting hole for connecting the brake trigger mechanism therethrough;

the number of the brake clamping blocks are two and the two brake clamping blocks are juxtaposed in the wedge-shaped groove formed between the two side vertical plates on the base; a friction plate is disposed on a clamping surface of each of the two brake clamping blocks, a back of each of the two brake clamping blocks is a lateral slope surface, so that a body of each of the two brake clamping blocks forms a wedge-shaped body, and the back of each of the two brake clamping blocks is provided with a lateral chute for inserting a brake push rod;

the support mechanism comprises a front support mechanism for laterally elastically pushing front portions of the two brake clamping blocks and a rear support mechanism for laterally elastically pushing the rear portions of the two brake clamping blocks;

the front baffle is fixed at the front opening of the wedge-shaped groove of the base for preventing the two brake clamping blocks from escaping from the front opening of the wedge-shaped groove; and the brake trigger mechanism is connected to the brake push rod by a compression spring, and the brake trigger mechanism is mounted in the mounting hole of each of the two side vertical plates, with the front end of the brake push rod passing through the mounting hole, its front end passes through a hole in the inner wall of each of the two side vertical plates and abutting within the lateral chute of the two brake clamping blocks;

wherein the front support mechanism comprises a support rod and a spring sleeved on the support rod, and each of two ends of the support rod is inserted within a first insertion hole at a position close to a front end of the clamping surface of each of the two brake clamping blocks, a diameter of the support rod is smaller than a diameter of the first insertion hole, and both ends of the spring abut against the clamping surfaces of the two brake clamping blocks; and wherein the rear support mechanism is a U-shaped spring, and the two upper ends of the U-shaped spring are bent into forwardly folded plugs, and the plugs are configured to insert into respective sockets defined in the rear end surface of the two brake clamping blocks.

2. The disc locking device of claim 1, wherein the disc locking device further comprises a limiting cover plate; the limiting cover plate is laterally disposed at an upper edge of the two side vertical plates for preventing the two brake clamping blocks from escaping from atop of the wedge-shaped groove; the inner side of the limiting cover plate exceeds the clamping surface of the brake clamping block at the side of the limiting cover plate on the initial position to limit the eccentric rotation of the brake disc.

3. The disc locking device of claim 1, wherein the disc locking device further comprises a needle roller slide plate, the needle roller slide plate is an L-shaped folded plate with a plurality of needle rollers being arranged in rows at the surface of the needle roller slide plate; the needle roller slide plate abuts against a sidewall and a bottom of the wedge-shaped groove of the base for providing a sliding support for the two brake clamping blocks.

4. The disc locking device of claim 3, wherein a front end of the needle roller slide plate is attached with one end of a tension spring, and the other end of the tension spring is fixed to the front baffle by a jackscrew.

5. The disc locking device of claim 1, wherein the first insertion hole is disposed at the clamping surface of the two brake clamping blocks at a position close to a lower portion of the front end, a center line of the first insertion hole is perpendicular to the clamping surface of the two brake clamping blocks, and a depth of the first insertion hole is controlled such that there is axial motion margin for the support rod when the two brake clamping blocks are in the clamped braking position.

6. The disc locking device of claim 1, wherein a threaded hole is disposed on the front end surface of each of the two brake clamping blocks, and the front surface of the front baffle is provided with a release hole opposite to the threaded hole.

7. The disc locking device of claim 2, wherein a threaded hole is disposed on the front end surface of each of the two brake clamping blocks, and the front surface of the front baffle is provided with a release hole opposite to the threaded hole.

8. The disc locking device of claim 3, wherein a threaded hole is disposed on the front end surface of each of the two brake clamping blocks, and the front surface of the front baffle is provided with a release hole opposite to the threaded hole.

9. The disc locking device of claim 4, wherein a threaded hole is disposed on the front end surface of each of the two brake clamping blocks, and the front surface of the front baffle is provided with a release hole opposite to the threaded hole.

10. The disc locking device of claim 5, wherein a threaded hole is disposed on the front end surface of each of the two brake clamping blocks, and the front surface of the front baffle is provided with a release hole opposite to the threaded hole.

11. The disc locking device of claim 1, wherein a bearing or a roller is disposed on the front end of the brake push rod.

12. The disc locking device of claim 2, wherein a bearing or a roller is disposed on the front end of the brake push rod.

13. The disc locking device of claim 3, wherein a bearing or a roller is disposed on the front end of the brake push rod.

14. The disc locking device of claim 4, wherein a bearing or a roller is disposed on the front end of the brake push rod.

15. The disc locking device of claim 5, wherein a bearing or a roller is disposed on the front end of the brake push rod.

* * * * *